(12) United States Patent   (10) Patent No.: US 8,350,953 B2
Goto   (45) Date of Patent: Jan. 8, 2013

(54) IMAGE PICKUP APPARATUS AND CAMERA

(75) Inventor: Hisashi Goto, Tokyo (JP)

(73) Assignee: Olympus Corporation, Tokyo (JP)

( * ) Notice: Subject to any disclaimer, the term of this patent is extended or adjusted under 35 U.S.C. 154(b) by 147 days.

(21) Appl. No.: 13/065,920

(22) Filed: Mar. 31, 2011

(65) Prior Publication Data

US 2011/0249156 A1    Oct. 13, 2011

(30) Foreign Application Priority Data

Apr. 9, 2010  (JP) ................ 2010-090446

(51) Int. Cl.
 G02B 13/00 (2006.01)
(52) U.S. Cl. ........................ 348/348; 348/350
(58) Field of Classification Search .......... 348/275–277, 348/348, 349, 350; 438/73, 75, 78, 107
See application file for complete search history.

(56) References Cited

U.S. PATENT DOCUMENTS 7,916,836 B2 * 3/2011 Tkaczyk et al. ............ 378/98.8

FOREIGN PATENT DOCUMENTS

| JP | 2000-156823 | 6/2000 |
|---|---|---|
| JP | 2008-040087 | 2/2008 |
| JP | 2008-224801 | 9/2008 |
| JP | 2009-044636 | 2/2009 |
| JP | 2009-044637 | 2/2009 |

* cited by examiner

Primary Examiner — Lin Ye
Assistant Examiner — Euel Cowan
(74) Attorney, Agent, or Firm — Kenyon & Kenyon LLP

(57) ABSTRACT

In an image pickup apparatus which includes a photoelectric conversion cell group in which, a plurality of photoelectric conversion cells which convert an optical image formed by an optical system to an electrical signal, are arranged two-dimensionally, at least some photoelectric conversion cells from among the plurality of photoelectric conversion cells are formed to output an image signal and a signal for ranging, and areas of a photoelectric conversion regions of photoelectric conversion cells which output the image signal, including the photoelectric conversion cells which output the image signal and the signal for ranging having the same spectral sensitivity of light received, in the photoelectric conversion cell group are substantially same, and the photoelectric conversion cells are arranged such that, for at least two photoelectric conversion cells which are necessary for ranging, a distance between centers of gravity of areas of the photoelectric conversion region of the photoelectric conversion cells which output the image signal and the signal for ranging differs from a distance between centers which is calculated from a pixel pitch.

8 Claims, 11 Drawing Sheets

FIG. 5

|  | F01 | F02 | F03 | F04 | F05 | F06 | F07 | F08 | F09 | F10 | F11 | F12 | F13 | F14 | F15 | F16 |
|---|---|---|---|---|---|---|---|---|---|---|---|---|---|---|---|---|
| L01 | G | R | G | R | G | R | G | R | G | R | G | R | G | R | G | R |
| L02 | B | G | B | G | B | G | B | G | B | G | B | G | B | G | B | G |
| L03 | G | R | G | R | G | R | G | R | G | R | G | R | G | R | G | R |
| L04 | B | G | B | G | B | G | B | G | B | G | B | G | B | G | B | G |
| L05 | G | R | G | R | G | R | G | R | G | R | G | R | G | R | G | R |
| L06 | B | G | B | G | B | G | B | G | B | G | B | G | B | G | B | G |
| L07 | G | R | G | R | G | R | G | R | G | R | G | R | G | R | G | R |
| L08 | B | G | B | G | B | G | B | G | B | G | B | G | B | G | B | G |
| L09 | G | R | G | R | G | R | G | R | G | R | G | R | G | R | G | R |
| L10 | B | G | B | G | B | G | B | G | B | G | B | G | B | G | B | G |
| L11 | G | R | G | R | G | R | G | R | G | R | G | R | G | R | G | R |
| L12 | B | G | B | G | B | G | B | G | B | G | B | G | B | G | B | G |
| L13 | G | R | G | R | G | R | G | R | G | R | G | R | G | R | G | R |
| L14 | B | G | B | G | B | G | B | G | B | G | B | G | B | G | B | G |
| L15 | G | R | G | R | G | R | G | R | G | R | G | R | G | R | G | R |
| L16 | B | G | B | G | B | G | B | G | B | G | B | G | B | G | B | G | ns

IMAGE PICKUP APPARATUS AND CAMERA

CROSS-REFERENCE TO RELATED APPLICATION

The present application is based upon and claims the benefit of priority from the prior Japanese Patent Application No. 2010-090446 filed on Apr. 9, 2010; the entire contents of which are incorporated herein by reference.

BACKGROUND OF THE INVENTION

1. Field of the Invention

The present invention relates to an image pickup apparatus and a camera.

2. Description of the Related Art

In conventional digital cameras, the following two types of auto focusing (AF) have been realized.

The first type is a type in which, apart from an image pickup element, a sensor for auto focusing has been imparted. A typical example of this type is a phase-difference type AF which is used in a single-lens reflex camera. A merit of this type is that a light beam which has passed through a taking lens is used and a problem of parallax is solved, and a focal shift is detected by a ranging signal once, thereby making it possible to focus the taking lens on an object, and shortening time till focusing.

On the other hand, in this type, it is necessary to dispose a means for dividing or switching an optical path, between the taking lens and the image pickup element. Furthermore, an optical system for AF is necessary between the means for splitting or switching the optical path and the sensor for AF. Firstly, there is an increase in a size due to securing of a space for the means for switching the optical path and securing of a space for the optical system for AF and the sensor for exclusive use. Moreover, as a further demerit, in a case of disposing the means for switching the optical path, a time lag occurs due to switching with a switching mechanism, and in a case of disposing the means for dividing the optical path, there is a loss in an amount of light due to optical-path splitting.

The second type is a type in which, an output of the image pickup element is used. A typical example of this type is a contrast AF in which, a so-called compact digital camera, and a video camera have been used. A merit of this type is a merit of space, as the image pickup element and the AF sensor are integrated, and a point that the number of structural members is fewer.

On the other hand, a demerit of this type are points that it is necessary to compare a multiple number of ranging signals, and that it takes time till focusing, due to wobbling. Furthermore, blurring of an image due to wobbling is captured, and according, an image quality is impaired. This trend is more remarkable as the number of pixels becomes larger.

Furthermore, in recent years, for a single lens reflex camera, which includes an optical finder in which, a quick return mirror and a roof prism are used, an interchangeable lens camera premised on an electronic view finder which does not require the quick return mirror and the roof prism, has already been released. In this interchangeable lens camera, it has been sought that both, a still photography and a video photography, have a high quality. Particularly, in such camera, an AF, in which, while having merits of the two types mentioned above, the demerits are eliminated, has been sought.

SUMMARY OF THE INVENTION

In an image pickup apparatus according to the present invention, which includes a photoelectric conversion cell group in which, a plurality of photoelectric conversion cells which convert an optical image formed by an optical system to an electrical signal, is arranged two-dimensionally, at least some photoelectric conversion cells from among the plurality of photoelectric conversion cells are formed to output an image signal and a signal for ranging, and areas of a photoelectric conversion regions of photoelectric conversion cells which output the image signal, including the photoelectric conversion cells which output the image signal and the signal for ranging having the same light-receiving spectral sensitivity, in the photoelectric conversion cell group are substantially same, and the photoelectric conversion cells are arranged such that, for at least two photoelectric conversion cells which are necessary for ranging, a distance between centers of gravity of areas of the photoelectric conversion regions of the photoelectric conversion cells which output the image signal and the signal for ranging differs from a distance between centers which is calculated from a pixel pitch.

In an image pickup apparatus which includes a photoelectric conversion cell group in which, photoelectric conversion cells which convert an optical image formed by an optical system to an electrical signal, are arranged two-dimensionally, the photoelectric conversion cell group includes photoelectric conversion cells which detect one of a plurality of colors, and at least some photoelectric conversion cells from among the photoelectric conversion cells are formed to output an image signal and a signal for ranging, and areas of a photoelectric conversion regions of photoelectric conversion cells which detect the same color, including the photoelectric conversion cells which output the image signal and the signal for ranging, out of the plurality of colors, in the photoelectric conversion cell group are substantially same, and the photoelectric conversion cells are arranged such that, for at least two photoelectric conversion cells which are necessary for ranging, a distance between centers of gravity of areas of the photoelectric conversion regions of the photoelectric conversion cells which output the image signal and the signal for ranging differs from a distance between centers which is calculated from a pixel pitch.

A camera according to the present invention includes one of the abovementioned image pickup apparatuses, and an image pickup optical system which forms an optical image in the image pickup apparatus.

BRIEF DESCRIPTION OF THE DRAWINGS

FIG. 5 is a plan view showing conceptually, an arrangement of color filters associated with FIG. 4;

DETAILED DESCRIPTION OF THE INVENTION

Figure 1:
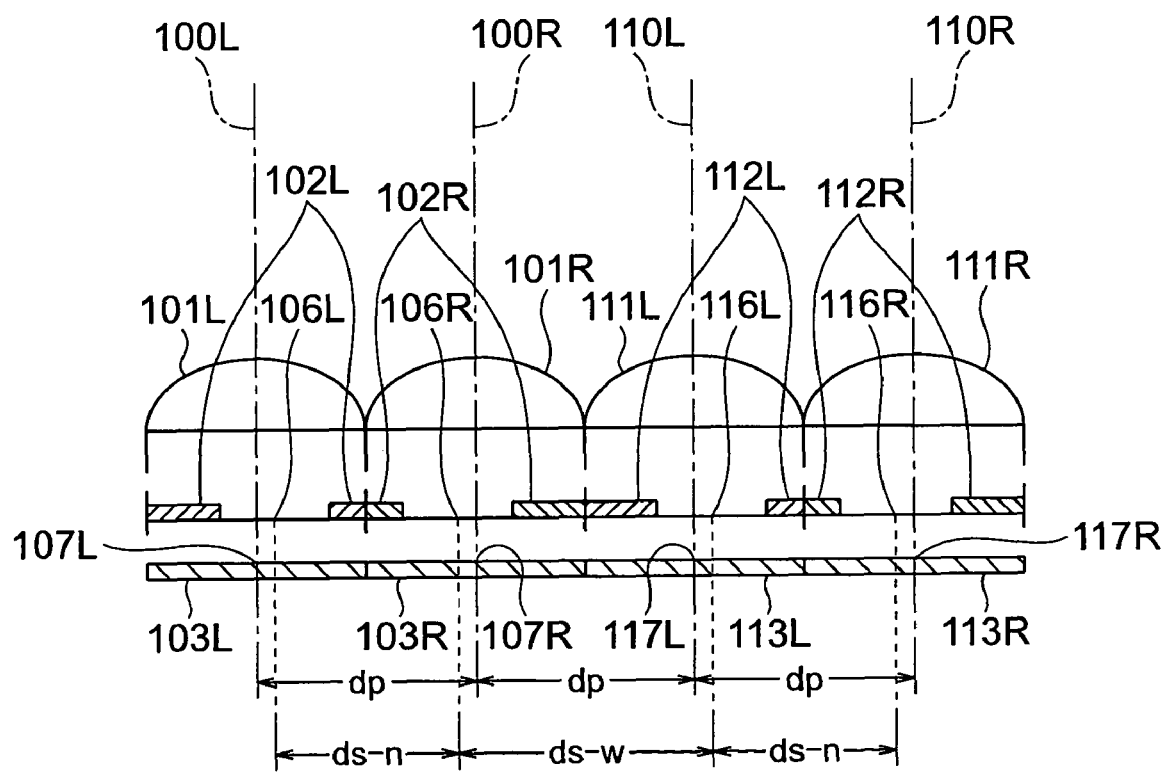
FIG. 1 is a cross-sectional view showing a schematic structure of pixels according to a first embodiment.

Exemplary embodiments of an image pickup apparatus and a camera according to the present invention will be described below in detail by referring to the accompanying diagrams. However, the present invention is not restricted to the embodiments described below.

To start with, an action and an effect of an image pickup apparatus according to the embodiments will be described below.

In an image pickup apparatus according to a first aspect of the present invention which includes a photoelectric conversion cell group in which, a plurality of photoelectric conversion cells which convert an optical image formed by an optical system to an electrical signal, is arranged two-dimensionally, at least some photoelectric conversion cells from among the plurality of photoelectric conversion cells are formed to output an image signal and a signal for ranging, and areas of a photoelectric conversion regions of photoelectric conversion cells which output the image signal, including the photoelectric conversion cells which output the image signal and the signal for ranging having the same light-receiving spectral sensitivity, in the photoelectric conversion cell group are substantially same, and the photoelectric conversion cells are arranged such that, for at least two photoelectric conversion cells which are necessary for ranging, a distance between centers of gravity of areas of the photoelectric conversion regions of the photoelectric conversion cells which output the image signal and the signal for ranging differs from a distance between centers which is calculated form a pixel pitch.

According to this arrangement, pixels having the same spectral sensitivity of light received, including pixels for ranging can be let to have same aperture efficiency (or vignetting factor). Therefore, it is possible to fetch the image signal from a large number of pixels including a case of fetching from all pixels, without a substantial gain-up of only the pixels for ranging, or without a gain-up. Consequently, this image pickup apparatus is capable of achieving a stable image quality, and moreover, a processing system can be structured to be simple.

Moreover, by arranging the photoelectric conversion cells to differ from the distance between the centers which is calculated from the pixel pitch, it is possible to detect an amount of shift and a direction of shift from a focal point by one signal similarly as in a phase-difference type AF. Particularly in the first aspect of the present invention, even when a density of the pixels for ranging is increased, since there is no effect on image quality, it is possible to determine a ranging accuracy and a ranging area by a process scale for ranging, without taking into consideration a trade-off with the image quality, and it is possible to structure an effective image pickup apparatus.

In the image pickup apparatus according to the first aspect of the present invention, it is preferable that, when the areas are substantially same, the areas satisfy the following conditional expression (1).

$$0.9 < SA/LA \leq 1 \qquad (1)$$

where,

LA denotes an area of the largest photoelectric conversion region of a photoelectric conversion cell having a light-receiving spectral sensitivity A, in the photoelectric conversion cell group, and SA denotes an area of the smallest photoelectric conversion region of the photoelectric conversion cell having the light-receiving spectral sensitivity A, in the photoelectric conversion cell group.

Conditional expression (1) is an expression in which, it has been quantified that the areas are substantially same, considering that the effect on the image quality is small even when there has been a gain-up. When a lower limit of conditional expression (1) is surpassed, as there is let to be a gain-up for matching a level of the output signal from SA with a level of the output signal from LA, there is a further degradation of the image quality, and therefore it is not preferable.

In an image pickup apparatus according to a second aspect of the present invention which includes a photoelectric conversion cell group in which, photoelectric conversion cells which convert an optical image formed by an optical system to an electrical signal, are arranged two-dimensionally, the photoelectric conversion cell group includes photoelectric conversion cells which detect one of a plurality of colors, and at least some photoelectric conversion cells from among the photoelectric conversion cells are formed to output an image signal and a signal for ranging, and areas of photoelectric conversion regions of photoelectric conversion cells which detect the same color, including the photoelectric conversion cells which output the image signal and the signal for ranging, out of the plurality of colors, in the photoelectric conversion cell group are substantially same, and the photoelectric conversion cells are arranged such that, for at least two photoelectric conversion cells which are necessary for ranging, a distance between centers of gravity of areas of the photoelectric conversion regions of the photoelectric conversion cells which output the image signal and the signal for ranging differs from a distance between centers which is calculated form a pixel pitch.

According to such arrangement, pixels of same color including pixels for ranging can be let to have same aperture efficiency. Therefore, it is possible to fetch the image signal from a large number of pixels including a case of fetching from all pixels, without a substantial gain-up of only the pixels for ranging, or without a gain-up. Consequently, this image pickup apparatus is capable of achieving a stable image quality, and moreover, a processing system can be structured to be simple.

Moreover, by arranging the photoelectric conversion cells to differ from the distance between the centers which is calculated from the pixel pitch, it is possible to detect an amount of shift and a direction of shift from a focal point by one signal similarly as in a phase-difference type AF. Particularly in the second aspect of the present invention, even when a density of pixels for ranging is increased, since there is no effect on image quality, it is possible to determine a ranging accuracy and a ranging area by a process scale for ranging, without taking into consideration a trade-off with the image quality, and it is possible to structure an effective image pickup apparatus.

Even in the image pickup apparatus according to the second aspect of the present invention, it is preferable that when the areas are substantially same, the areas satisfy the following conditional expression (1).

$$0.9 < SA/LA \leq 1 \qquad (1)$$

where,

LA denotes an area of the largest photoelectric conversion region of a photoelectric conversion cell which detects a color A, in the photoelectric conversion cell group, SA denotes an area of the smallest photoelectric conversion region of the photoelectric conversion cell which detects the color A, in the photoelectric conversion cell group, and the color A is an arbitrary color from among the plurality of colors.

Conditional expression (1) is an expression in which, it has been quantified that the areas are substantially same, considering that the effect on the image quality if small even when there has been a gain-up. When a lower limit of conditional expression (1) is surpassed, as a gain-up is carried out for matching a level of the output signal from SA with a level of the output signal from LA, there is a further degradation of the image quality, and therefore, it is not preferable.

In the image pickup apparatus according to the embodiments, it is preferable that the photoelectric conversion cell includes a micro lens which is disposed on a photoelectric conversion portion, and a light-shielding portion which is disposed between the micro lens and the photoelectric conversion portion, and an area of an opening of the light-shielding portion determines a photoelectric conversion region.

By arranging the light-shielding portion, it is easy to regulate a relationship between a center of gravity of area of the photoelectric conversion region and the center of pixel which is regulated by the pixel pitch. Accordingly, it is easy to stabilize or to improve the accuracy of ranging.

In the image pickup apparatus according to the embodiments, it is preferable to adjust a focus of the optical system which is for focusing into images of object on an image pickup element by a comparison of output signals from the photoelectric conversion cells which are arranged to differ from a distance between centers calculated from the pixel pitch.

Accordingly, in the arrangement according to the first aspect or the second aspect of the present invention, since it is possible let output signal from a large number of photoelectric conversion cells to be subjected to a comparison of signals for focus, it is possible to achieve both, a favorable image quality and a favorable focus.

In the image pickup apparatus according to the embodiments, it is preferable that the comparison of output signals from the photoelectric conversion cells is carried out by output signals from the plurality of photoelectric conversion cells.

Accordingly, it is possible to fetch phase-difference information from the output signal from the large number of photoelectric conversion cells, and it is possible to have an arrangement favorable for a speed and accuracy of focus.

In the image pickup apparatus according to the embodiments, it is preferable that each of a photoelectric conversion region of photoelectric conversion cells of a first cell group which outputs an image signal and a signal for ranging, and a photoelectric conversion region of photoelectric conversion cells of a second cell group which is different from the first cell group, which outputs an image signal and a signal for ranging is disposed such that the distance between the centers calculated from the pixel pitch differs for each of the photoelectric conversion region, and the photoelectric conversion cells of the first cell group and the photoelectric conversion cells of the second cell group are disposed such that the distance between the centers calculated from the pixel pitch differs for the photoelectric conversion cells of the first cell group and the photoelectric conversion cells of the second cell group, and a focus of the optical system for focusing into an image of object on the image pickup element is adjusted by a comparison of a signal from the photoelectric conversion cell of the first cell group and a signal from the photoelectric conversion cell of the second cell group.

According to such arrangement, by comparing the signals of the cell groups for which the pixel pitch has been matched, it is possible to acquire a stable focus signal. For instance, in a case of the phase-difference type, it is possible to improve an accuracy of a correlation calculation (calculation of an amount of phase-difference).

In the image pickup apparatus according to the embodiments, it is preferable that all pixels which output the image signal have a common photoelectric conversion region with respect to respective pixel centers.

By making such arrangement, it is possible to overlap a pupil region of a taking lens with a photoelectric conversion region of the respective pixels for ranging, and to adopt an arrangement without splitting. Moreover, by adopting such arrangement, it is possible to achieve sufficient aperture rate, and to achieve a favorable image even of a dark object. Such an arrangement was difficult to be realized in a phase-difference AF system which has been installed in a conventional single-lens reflex camera, and even compared to this it is possible to improve an accuracy of focus for a dark object.

First Embodiment

Figure 2:
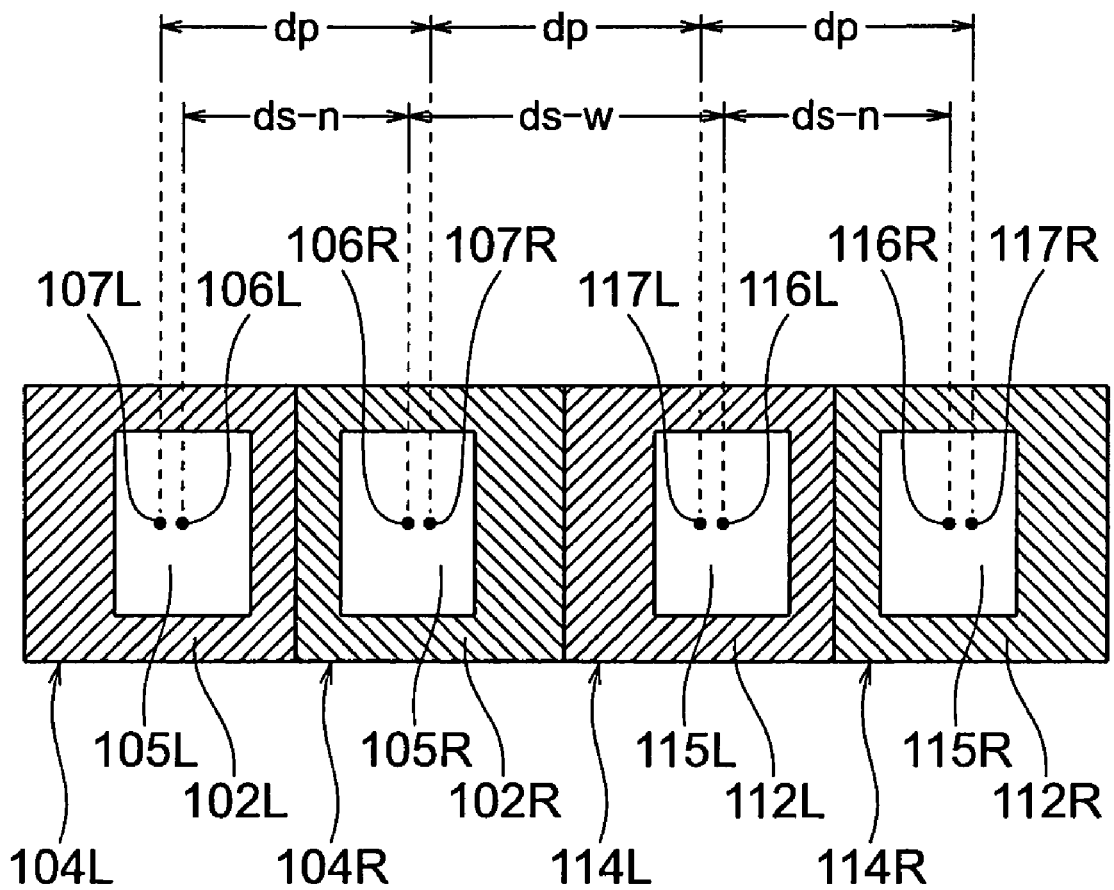
FIG. 2 is a plan view when the pixels shown in FIG. 1 are seen from optical axial directions.

FIG. 1 is a cross-sectional view showing a schematic structure of pixels according to a first embodiment. FIG. 2 is a plan view when the pixels shown in FIG. 1 are seen from directions of optical axes 100L, 100R, 110L, and 110R. In FIG. 2, micro lenses 101L, 101R, 111L, and 111R are omitted.

In FIG. 1 and FIG. 2, pixels which are lined up side-by-side are shown. Areas of photoelectric conversion regions 105L, 105R, 115L, and 115R are same, and distances ds-n and ds-w of positions of centers of gravity of the area (distance between center of gravity (center of mass) of areas) differ from a distance dp of the pixel pitch.

Here, it is preferable that the area of each of the photoelectric conversion regions 105L, 105R, 115L, and 115R is substantially same. When the area is substantially same, it is preferable that the area satisfies the following conditional expression (1).

$$0.9 < SA/LA \leq 1 \quad (1)$$

where,

LA denotes an area of the largest photoelectric conversion region of a photoelectric conversion cell having a light-receiving spectral sensitivity A, in the photoelectric conversion cell group, and SA denotes an area of the smallest photoelectric conversion region of the photoelectric conversion cell having the light-receiving spectral sensitivity A, in the photoelectric conversion cell group.

In FIG. 1 and FIG. 2, the micro lenses (sometimes also called as 'on-chip lenses') 101L, 101R, 111L, and 111R are disposed to correspond to pixels 104L, 104R, 114L, and 114R respectively, of a sensor. A distance of the micro lenses 101L, 101R, 111L, and 111R is according to the pixel pitch. However, taking into consideration a position of an exit pupil of the taking lens, the micro lenses 101L, 101R, 111L, and 111R may be disposed at an interval narrower than the pixel pitch from a center toward a periphery.

The pixels 104L, 104R, 114L, and 114R include photoelectric conversion surfaces 103L, 103R, 113L, and 113R respectively of a photoelectric conversion cell group. In the respective pixels, a light shielding member 102L is disposed between the micro lens 101L and the photoelectric conversion surface 103L, a light shielding member 102R is disposed between the micro lens 101R and the photoelectric conversion surface 103R, a light shielding member 112L is disposed between the micro lens 111L and the photoelectric conversion surface 113L, and a light shielding member 112R is disposed between the micro lens 111R and the photoelectric conversion surface 113R. The light shielding members 102L, 102R, 112L, and 112R are disposed to be along four sides respectively of the photoelectric conversion surfaces 103L, 103R, 113L, and 113R having a rectangular shape in a plan view. A planar shape of each of the light shielding members 102L, 102R, 112L, and 112R is bilaterally asymmetric with respect to a pixel center, as shown in FIG. 2.

In FIG. 1 showing the schematic structure, the light shielding members 102L, 102R, 112L, and 112R are arranged on the same plane. However, the light shielding members 102L, 102R, 112L, and 112R may not be arranged on the same plane in the same pixel.

The photoelectric conversion regions 105L, 105R, 115L, and 115R of the pixels are determined by a relationship of the micro lenses 101L, 101R, 111L, and 111R, the light shielding members 102L, 102R, 112L, and 112R, the photoelectric conversion surfaces 103L, 103R, 113L, and 113R, and a taking lens to be assumed. The photoelectric conversion regions 105L, 105R, 115L, and 115R shown in FIG. 2 correspond to apertures formed by the light shielding members 102L, 102R, 112L, and 102R on the photoelectric conversion surfaces 103L, 103R, 113L, and 113R.

The micro lenses 101L, 101R, 111L, and 111R are disposed such that the optical axes 100L, 100R, 110L, and 110R of the micro lenses 101L, 101R, 111L, and 111R respectively pass through pixel centers 107L, 107R, 117L, and 117R of the corresponding pixels.

The pixels 104L, 104R, 114L, and 114R, as seen from the optical axes 100L, 100R, 110L, and 110R, have the same rectangular shape, and have a pixel pitch same as a size of the pixel. The pixel centers 107L, 107R, 117L, and 117R of the pixels 104L, 104R, 114L, and 114R are points of intersection of diagonals of the rectangular planar shape thereof (FIG. 2).

Moreover, centers of gravity 106L, 106R, 116L, and 116R of areas of the photoelectric conversion regions 105L, 105R, 115L, and 115R having a rectangular shape in a plan view are also points of intersection of diagonals thereof (FIG. 2).

In the first embodiment, by letting the planar shape of the light shielding members 102L, 102R, 112L, and 112R to be a bilaterally asymmetric rectangular shape, the pixels centers 107L, 107R, 117L, and 117R of the pixels and the centers of gravity 106L, 106R, 116L, and 116R of the areas of the photoelectric conversion regions are shifted in a horizontal direction (a left-right direction in FIG. 1 and FIG. 2). Consequently, the pixel pitch dp which is equivalent to a distance between the pixel centers 107L, 107R, 117L, and 117R of adjacent pixels is not same as distances ds-n and ds-w of centers of gravity of area which are distances between the centers of gravity 106L, 106R, 116L, and 116R of the areas of the adjacent photoelectric conversion regions.

Here, the distance ds-n between the centers of gravity of areas is a distance between the centers of gravity of areas when the centers of gravity of the areas of the adjacent photoelectric conversion regions are shifted in the horizontal direction to come mutually closer, and in an example in FIG. 1 and FIG. 2, a distance between the center of gravity 106L of the area of the pixel 104L and the center of gravity 106R of the area of the pixel 104R is a distance between the center of gravity 116L of the area of the pixel 114L and the center of gravity 116R of the area of the pixel 114R. Whereas, the distance ds-w between the centers of gravity of areas is a distance between the centers of gravity of the areas when the centers of gravity of the areas of the adjacent photoelectric conversion regions are shifted in the horizontal direction to be separated apart mutually, and in the example in FIG. 1 and FIG. 2, is a distance between the center of gravity 106R of the area of the pixel 104R and the center of gravity 106L of the area of the pixel 114L.

Figure 3:
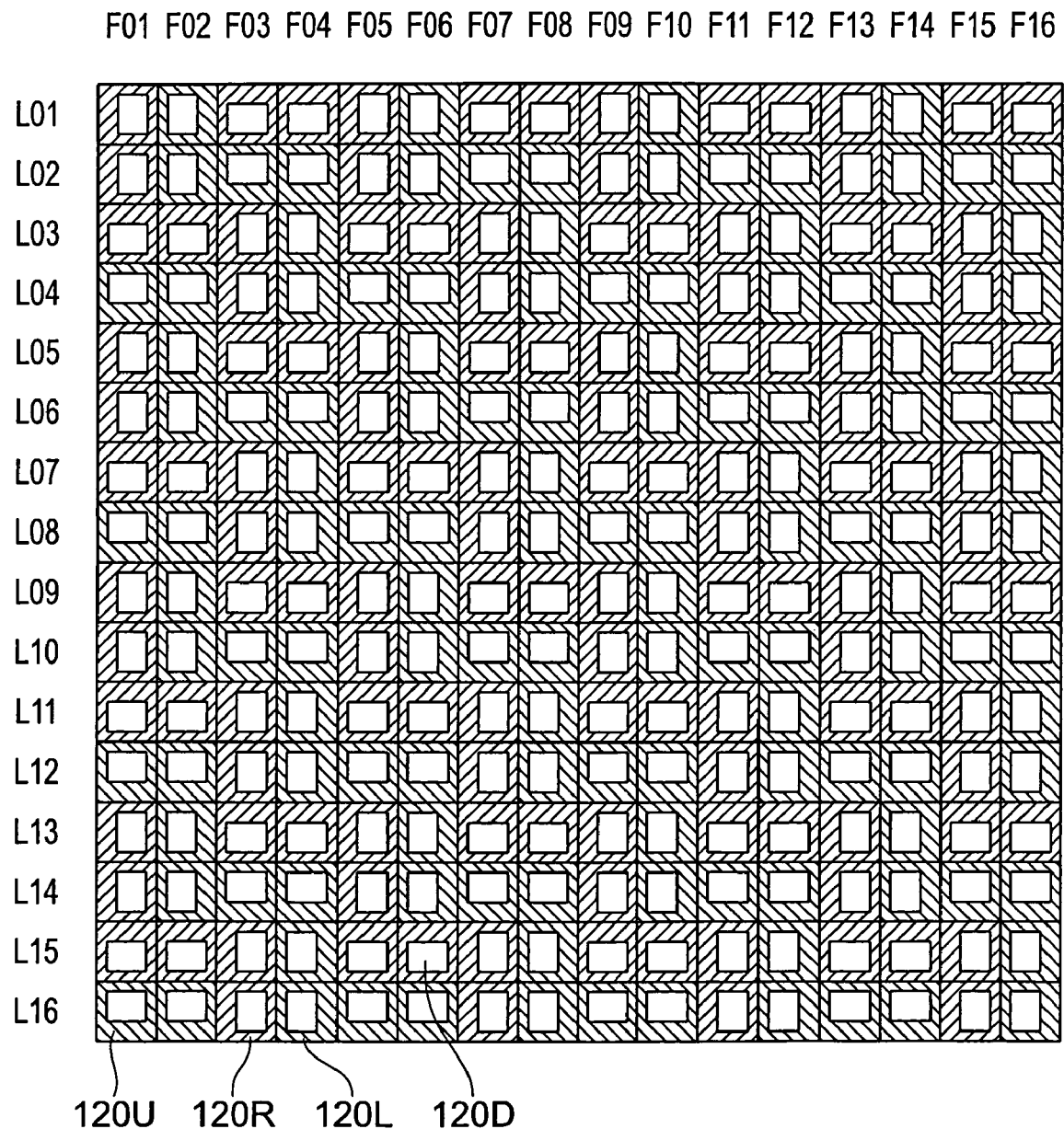
FIG. 3 is a plan view showing conceptually, an arrangement of pixels in an imager according to the first embodiment.

FIG. 3 is a plan view showing conceptually, an arrangement of pixels in an imager according to the first embodiment.

The imager (image pickup apparatus) shown in FIG. 3 includes a combination of the pixels shown in FIG. 1 and FIG. 2, and pixels having pixel centers and the centers of gravity of the areas of the photoelectric conversion regions shifted in a vertical direction (a vertical direction in FIG. 1 and FIG. 2). FIG. 3 is a diagram in which, photoelectric conversion regions viewed from optical axial directions of the pixels are shown. In FIG. 3, an example of 16 vertical pixels (L01 to L16) and 16 horizontal pixels (F01 to F16), a total of 256 pixels, is shown. However, the number of pixels is not restricted to 256, and it may be an example in which, the total number of pixels is more than 10 million.

In the example in FIG. 3, directions in which, centers of areas of photoelectric conversion regions are shifted with respect to the pixel centers are four namely, a right side, a left side, an upper side, and a lower side. In the following description, pixels in respective directions will be called as a right pixel 120R, a left pixel 120L, an upper pixel 120U, and a lower pixel 120D. The pixel 104L and the pixel 114L in FIG. 2 correspond to the right pixel 120R, and the pixel 104R and the pixel 114R in FIG. 2 correspond to the left pixel 120L.

In FIG. 3, in a row L01, the right pixel 120R, the left pixel 120L, the lower pixel 120D, and the upper pixel 120D are disposed repeatedly in order from left (from F01). In a row L02, the right pixel 120R, the left pixel 120R, the upper pixel 120U, and the upper pixel 120U are disposed repeatedly in order from left. In a row L03, the lower pixel 120D, the lower pixel 120D, the right pixel 120R, and the left pixel 120L are disposed repeatedly in order from left. In a row L04, the upper pixel 120U, the upper pixel 120U, the right pixel 120R, and the left pixel 120L are disposed repeatedly in order from left. In a row L05 and onward, an arrangement is such that, a pattern of L01, L02, L03, and L04 is disposed repeatedly.

The arrangement, when seen from columns F01 to F16, is as follows.

In a column F01, the right pixels 120R, the right pixel 120R, the lower pixel 120D, and the upper pixel 120U are disposed repeatedly in order from the top (from L01). In a column F02, the left pixel 120L, the left pixel 120L, the lower pixel 120D, and the upper pixel 120U are disposed repeatedly in order from the top. In a column F03, the lower pixel 120D, the upper pixel 120U, the right pixel 120R, and the right pixel 120R are disposed repeatedly in order from the top. In a column F04, the lower pixel 120D, the upper pixel 120U, the left pixel 120L, and the left pixel 120L are disposed repeatedly in order from the top. In a column L05 and onward, an arrangement is such that, a pattern of F01, F02, F03, and F04 is disposed repeatedly.

In the following description, when a specific pixel is to be indicated, the row numbers L01 to L016 and the column numbers F01 to F16 are indicated to be aligned. For example, a pixel in the row L01, corresponding to the column F01 will be indicated by 'L01 F01'.

In an example shown in FIG. 3, for instance, an arrangement is such that, a distance between centers of gravity of L05 F01 (the right pixel 120R) and one of L05 F02, L05 F06, L05 F10, L05 F14, L06 F02, L06 F10, and L06 F14 (the left pixel 120L) is smaller than a distance between pixels which is calculated from the pixel pitch. Moreover, an arrangement is such that, a distance between centers of gravity of L05 F06 (the left pixel 120L) and one of L05 F09 and L06 F09 (the right pixel 120R) is larger than the distance between pixels which is calculated from the pixel pitch. In other words, an arrangement is such that a distance between centers of gravities of respective left images and respective right images differs from the distance between pixels which is calculated from the pixel pitch.

In the image pickup apparatus according to the first embodiment, it is possible to adjust a focus of an optical system by calculating phase-difference information from an output signal (a signal for ranging) of each of a cell group which includes the left pixels 120L and another cell group which includes the right pixels 120R.

For instance, as a first example, by comparing an output waveform obtained from L05 F01, L05 F05, L05 F09, and L05 F13 which are right pixels 120R of the row L05 and an output waveform obtained from L05 F02, L05 F06, L05 F10, and L05 F14 which are left pixels 120L of the row L05, it is possible to achieve focal-point position information and defocus information by a so-called phase-difference detection.

Moreover, as a second example, firstly, for the rows L05 and L06 respectively, output waveforms achieved from cells of columns F01, F02, F05, F06, F09, F10, F13, and F14 are added for each column. Next, by comparing an output waveform achieved for each of columns F01, F05, F09, and F13 which are right pixels 120R and output waveform achieved from each of columns F02, F06, F10, and F14 which are left pixels 120L, it is possible to achieve the focal-point position information and the defocus information by the so-called phase-difference detection. In the second example, by adding in each column, a stable signal processing is possible even when an amount of light from the taking lens is further smaller.

As a third example, firstly, an output waveform which is achieved from L05 F01, L05 F05, L05 F09, and L05 F13 which are right pixels 120R of the row L05, and an output waveform which is achieved from L07 F03, L07 F07, L07 F11, and L07 F15 which are right pixels 120R of a row L07 are combined, and let to be an output waveform of a column of right images which is formed in order of F01, F03, F05, F07, F09, F11, and F13.

On the other hand, an output waveform which is achieved from L05 F02, L05 F06, L05 F10, and L05 F14 which are left pixels 120L of the row L05, and an output waveform which is achieved from L06 F04, L06 F08, L06 F12, and L06 F16 which are left pixels 120L of a row L06 are combined, and let to be an output waveform of columns of left images which is formed in order of F02, F04, F06, F08, F10, F12, F14, and F16.

Next, by comparing the output waveform of the column of right images and the output waveform of the column of left images, the focal-point position information and defocus information are acquired by the so-called phase-difference detection. In the third example, by adding the output signals of two different rows, it is possible to carry out stable signal processing even for an object of a high frequency.

Apart from the abovementioned examples, the second example and the third example may be combined for example.

Moreover, the abovementioned examples are examples related to the comparison of the right pixels 120R and the left pixels 120L. However, it is possible to acquire the focal-point position information and the defocus information from a comparison of the upper pixels 120U and the lower pixels 120D in a similar manner. Furthermore, a combination thereof, or a combination with a so-called contrast method may be used.

Moreover, similarly as for a normal image pickup element, it is possible to fetch an image signal as photoelectric conversion information, from pixels of the columns F01 to F16 of the rows L01 to L16. In this case, since a size of the photoelectric conversion region is same in each pixel, a process such as gain-up for adjusting a difference in the size of the photoelectric conversion regions is not necessary. Accordingly, it leads to reduction of noise, and as a result, an S/N ration is improved.

In FIG. 3, for simplifying, an example of 16 pixels×16 pixels is shown. However, when it is applied to an image pickup element of about 2800 pixels×4200 pixels for example, which is prevalent, it possible to have a sufficient length of the column of right images and the column of left images which are to be compared for ranging. Moreover, the column of right images and the column of left images which have been discrete can be considered to be almost continuous.

In pixel arrangements shown in FIG. 1, FIG. 2, and FIG. 3, an optical axis of a micro lens of each pixel intersects the photoelectric conversion region. By making such an arrangement, since it is possible to increase an amount of light received by a sensor, it is possible to increase the S/N ratio at the time of fetching the image signal, and accordingly, it becomes easy to form a favorable image.

Figure 4:
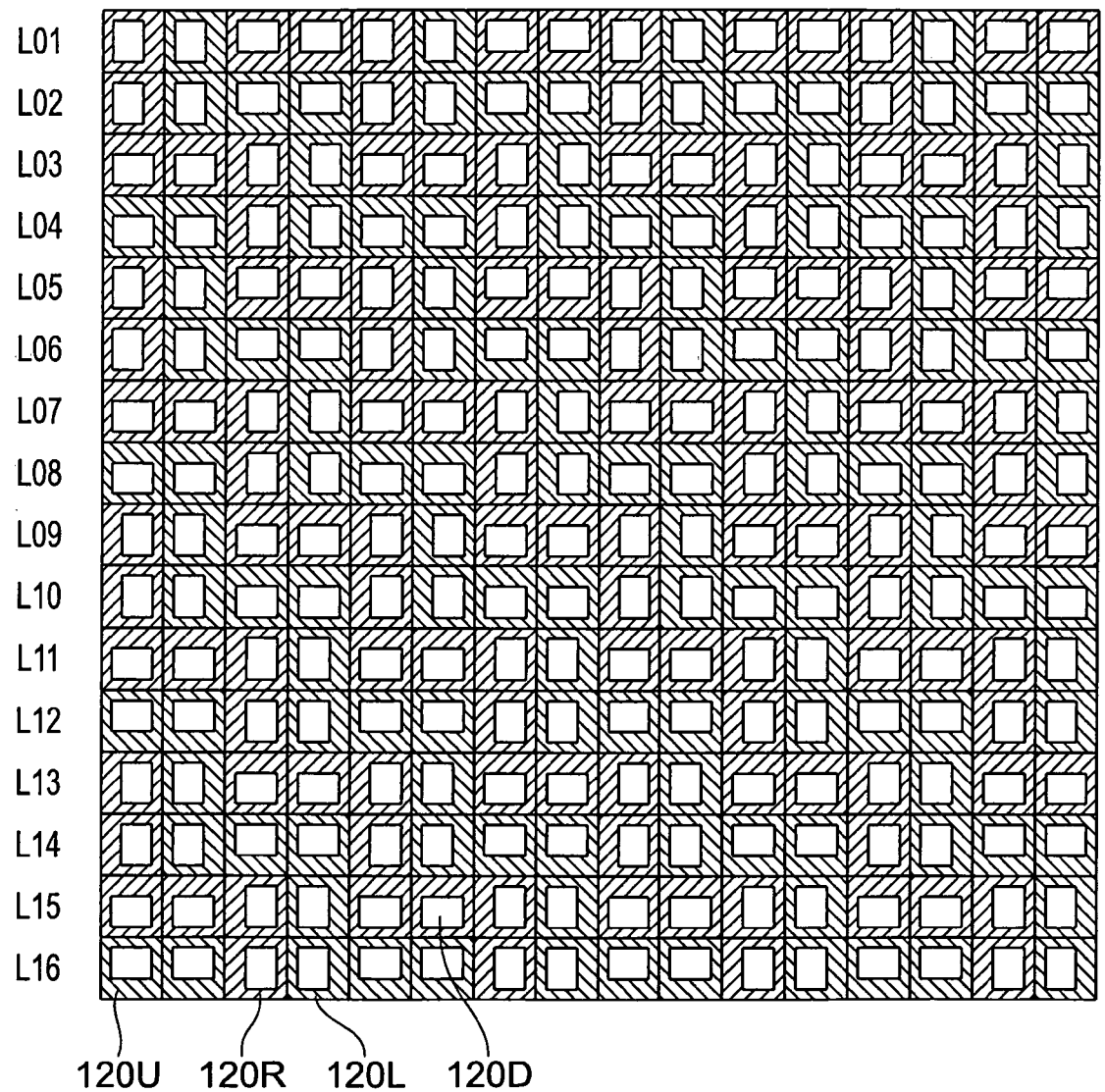
FIG. 4 is a plan view showing conceptually, an arrangement of pixels in an imager according to a modified embodiment of the first embodiment.

FIG. 4 is a plan view showing conceptually, an arrangement of pixels in an imager (image pickup apparatus) according to a modified embodiment of the first embodiment. FIG. 5 is a plan view showing conceptually, an arrangement of a color filter associated with FIG. 4.

The arrangement of pixels shown in FIG. 4, similarly as in FIG. 3, is an arrangement in which, four types of pixels namely the right pixel 120R, the left pixel 120L, the upper pixel 120U, and the lower pixel 120D are combined, and arrangement of each pixel differs from the arrangement in FIG. 3. In the arrangement shown in FIG. 4, pixels of the same type are disposed for pixels of two adjacent rows and two adjacent columns. For example, pixels of two adjacent rows and two adjacent columns of L01 F01, L01 F02, L02 F01, and L02 F02 are all left pixels 120L, and pixels of two adjacent rows and two adjacent columns of L01 F03, L01 F04, L02 F03, and L02 F04 are all upper pixels 120U.

It is preferable to overlap the arrangement of the color filters shown in FIG. 5 on the arrangement of pixels shown in FIG. 4. In the arrangement of the color filter in FIG. 5, the pixel L01 F01 is let to be a filter G for green color, the pixel L01 F02 is let to be a filter R for red color, the pixel L02 F01 is let to be a filter B for blue color, and the pixel L02 F02 is let to be a filter G for green color, and these combination patterns are repeated in a horizontal direction and a vertical direction. These combination patterns are disposed corresponding to the pixels of the two adjacent rows and the two adjacent columns in which, the pixels of the same type are arranged in FIG. 4. By associating the arrangement of the pixels in FIG. 4 and the arrangement of color filters in FIG. 5, it is possible to carry out a highly accurate detection of a focal point irrespective of a color of the object. Combinations of a direction of shift from the pixel center of the photoelectric conversion region and the color filter is not required to be restricted to the abovementioned combination.

Moreover, in FIG. 4 and FIG. 5, for ranging, when the left pixel 120L and the right pixel 120R, or the upper pixel 120U and the lower pixel 120D are selected, the distance between the centers of gravity differs from the distance which is calculated from the pixel pitch. In FIG. 5, since the filters G, R, B, and G of the two adjacent rows and two adjacent columns are disposed repeatedly, it is possible to select a filter of the same color while selecting two pixels for ranging. For instance, the pixel L06 F01 (left pixel 120L) and the pixel L04 F03 (right pixel 120R) are the same filter B for blue color, and the distance between the centers of gravity of the photoelectric conversion region becomes longer than the distance which is calculated from the pixel pitch. Moreover, the pixel L03 F03 and the pixel L05 F05 are the same filter G for green color, and the distance between the centers of gravity of the photoelectric conversion region becomes shorter than the distance which is calculated from the pixel pitch.

Second Embodiment

Figure 6:
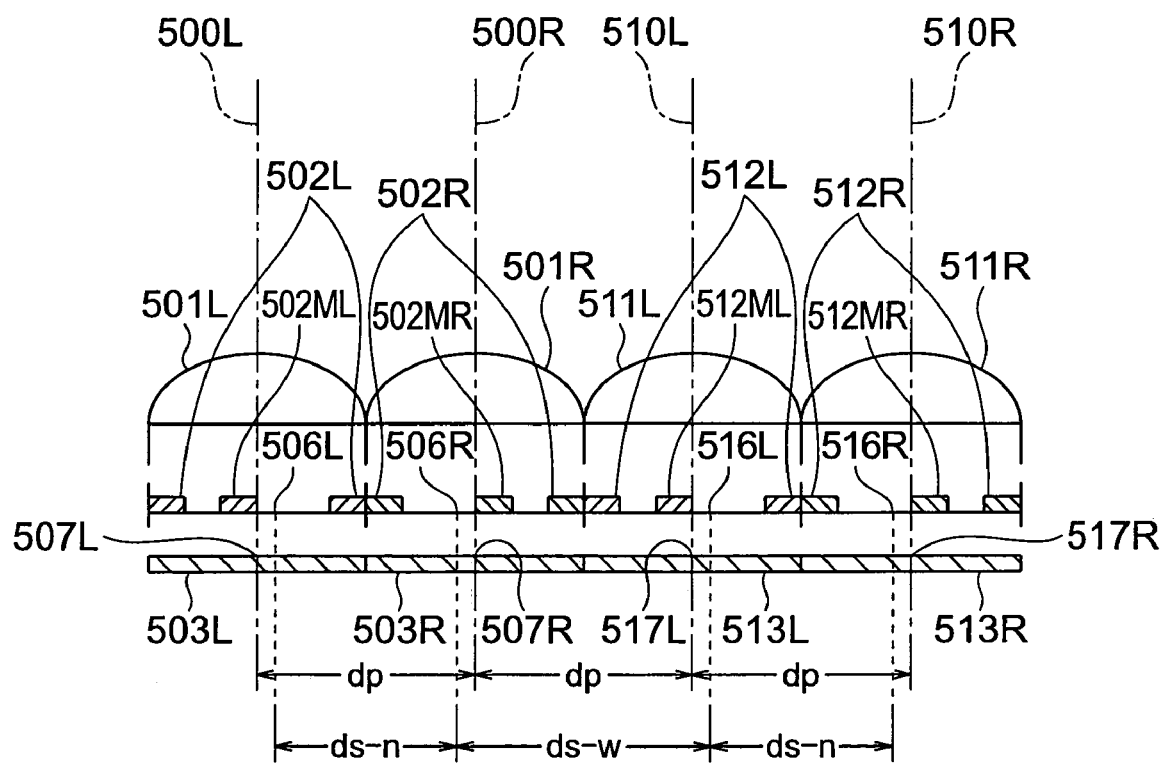
FIG. 6 is a cross-sectional view showing a schematic structure of pixels according to a second embodiment.
Figure 7:
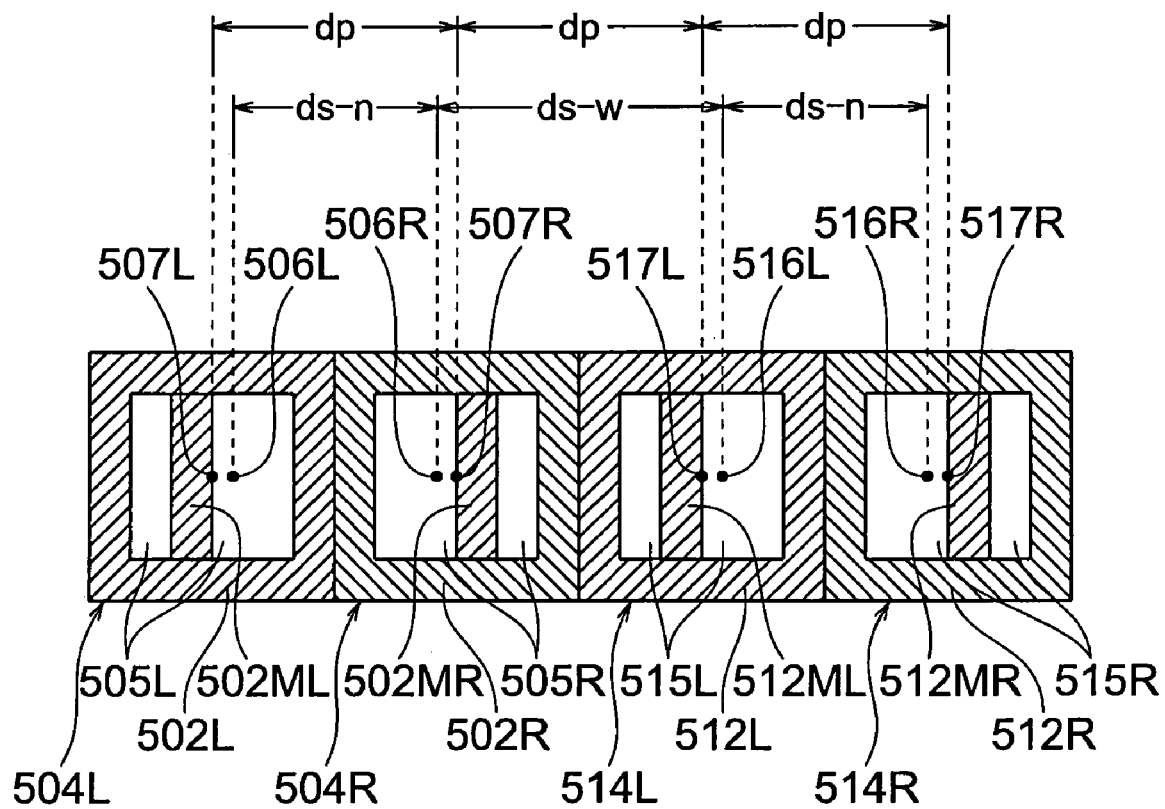
FIG. 7 is a plan view when pixels shown in FIG. 6 are seen from optical axial directions.

FIG. 6 is a cross-sectional view showing a schematic structure of pixels according to a second embodiment. FIG. 7 is a plan view when pixels shown in FIG. 6 are seen from directions of optical axes 500L, 500R, 510L, and 510R. In FIG. 7, micro lenses 501L, 501R, 511L, and 511R are omitted.

In FIG. 6 and FIG. 7, pixels which are lined up side-by-side are shown. An area of photoelectric conversion regions 505L, 505R, 515L, and 515R is same, and distances ds-n and ds-w of positions of centers of gravity of the area (distance between center of gravity of areas) differ from a distance dp of the pixel pitch.

Here, it is preferable that the area of each of the photoelectric conversion regions 505L, 505R, 515L, and 515R is substantially same. When the area is substantially same, it is preferable that the area satisfies the following conditional expression (1).

$$0.9 < SA/LA \leq 1 \quad (1)$$

where,

LA denotes an area of the largest photoelectric conversion region of a photoelectric conversion cell having a light-receiving spectral sensitivity A, in the photoelectric conversion cell group, and SA denotes an area of the smallest photoelectric conversion region of the photoelectric conversion cell having the light-receiving spectral sensitivity A, in the photoelectric conversion cell group.

In FIG. 6 and FIG. 7, the micro lenses 501L, 501R, 511L, and 511R are disposed to correspond to pixels 504L, 504R, 514L, and 514R respectively, of a sensor. A distance of the micro lenses 501L, 501R, 511L, and 511R is according to the pixel pitch. However, taking into consideration a position of an exit pupil of a taking lens, the micro lenses 501L, 501R, 511L, and 511R may be disposed at an interval smaller than the pixel pitch from a center toward a periphery.

The pixels 504L, 504R, 514L, and 514R include photoelectric conversion surfaces 503L, 503R, 513L, and 513R respectively of a photoelectric conversion cell group. In the respective pixels, light shielding member 502L and 502ML are disposed between the micro lens 501L and the photoelectric conversion surface 503L, light shielding members 502R and 502MR are disposed between the micro lens 501R and the photoelectric conversion surface 503R, light shielding members 512L and 512ML are disposed between the micro lens 511L and the photoelectric conversion surface 513L, and light shielding members 512R and 512MR are disposed between the micro lens 511R and the photoelectric conversion surface 513R.

The light shielding members 502L, 502R, 512L, and 512R are disposed to be along four sides respectively of the photoelectric conversion surfaces 503L, 503R, 513L, and 513R having a rectangular shape in a plan view. A planar shape of each of the light shielding members 502L, 502R, 512L, and 512R, as shown in FIG. 7, is bilaterally symmetrical with a uniform width, and has a diphycercally symmetrical rectangular-frame shape.

The light shielding members 502ML, 502MR, 512ML, and 512MR are disposed to split inner portions of the light shielding members 502L, 502R, 512L, and 512R bilaterally asymmetrically.

In FIG. 6 showing the schematic structure, the light shielding members 502L, 502ML, 502R, 502MR, 512L, 512ML, 512R, and 512MR are arranged on the same plane. However, the light shielding members 502L, 502ML, 502R, 502MR, 512L, 512ML, 512R, and 512MR may not be arranged on the same plane in the same pixel.

The photoelectric conversion regions 505L, 505R, 515L, and 515R of the pixels are determined by a relationship of the micro lenses 501L, 501R, 511L, and 511R, the light shielding members 502L, 502ML, 502R, 502MR, 512LM 512ML, 512R, and 512MR, the photoelectric conversion surfaces 503L, 503R, 513L, and 513R, and a taking lens to be assumed. The photoelectric conversion regions 505L, 505R, 515L, and 515R shown in FIG. 7 correspond to apertures formed by the light shielding members 502L, 502ML, 502R, 502MR, 512L, 512ML, 512R, and 512MR on the photoelectric conversion surfaces 503L, 503R, 513L, and 513R.

The micro lenses 501L, 501R, 511L, and 511R are disposed such that optical axes 500L, 500R, 510L, and 510R of the micro lenses 501L, 501R, 511L, and 511R respectively pass through pixel centers 507L, 507R, 517L, and 517R of the corresponding pixels.

The pixels 504L, 504R, 514L, and 514R, as seen from the optical axes 500L, 500R, 510L, and 511R, have the same rectangular shape, and have a pixel pitch same as a size of the pixel. The pixel centers 507L, 507R, 517L, and 517R of the pixels 504L, 504R, 514L, and 514R are points of intersection of diagonals of the rectangular planar shape thereof (FIG. 7).

In the second embodiment, regions surrounded by the light shielding members 502L, 502R, 512L, and 512R are divided bilaterally asymmetrically by the light shielding members 502ML, 502MR, 512ML, and 512MR respectively. Therefore, the centers of gravity of the areas of the photoelectric conversion regions 505L, 505R, 515L, and 515R which are determined by these light shielding members are at positions shifted from the pixel centers 507L, 507R, 517L, and 517R of the pixels. Consequently, the pixel pitch dp which is same as a distance between the pixel centers 507L, 507R, 517L, and 517R of adjacent pixels is not same as distances ds-n and ds-w of centers of gravity of area which are distances between the centers of gravity 506L, 506R, 516L, and 516R of the areas of the adjacent photoelectric conversion regions.

The light shielding members 502ML, 502MR, 512ML, and 512MR may have a function of an electric wire etc. Moreover, the light shielding members 502ML, 502MR, 512ML, and 512MR may not divide the photoelectric conversion regions 505L, 505R, 515L, and 515R completely. Moreover, at least in one of the light shielding members 502ML, 502MR, 512ML, and 512MR, the position of center of gravity can be shifted effectively by making an arrangement such that the optical axis of the corresponding lens is not included substantially. This makes possible an arrangement such that the center of a pixel becomes a light-receiving area for a pixel which has been provided not to be on an optical axis of the corresponding micro lens, from among the light shielding members 502ML, 502MR, 512ML, and 512MR. In FIG. 6 and FIG. 7, an arrangement has been made such that one-end surface of each of light shielding members 502ML, 502MR, 512ML, and 512MR is determined in an area determined by the optical axis of each micro lens.

Figure 8:
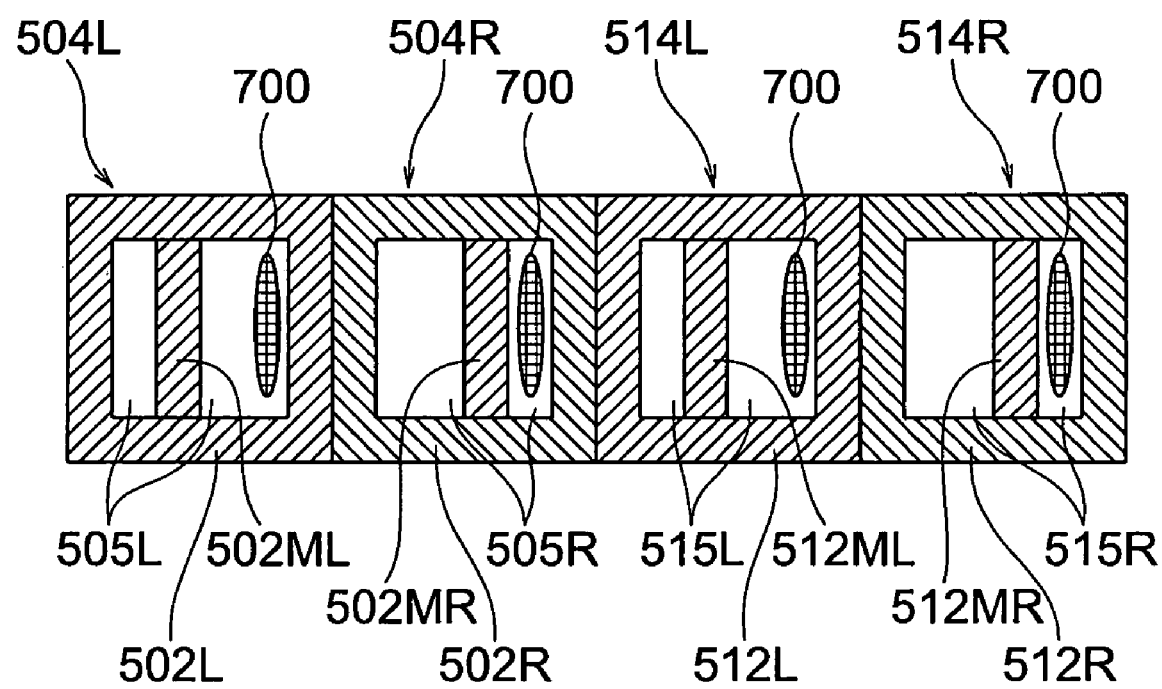
FIG. 8 is a plan view showing a common region in photoelectric conversion regions.

FIG. 8 is a plan view showing a common region 700 in the photoelectric conversion regions 505L, 505R, 515L, and 515R. As shown in FIG. 8, the photoelectric conversion regions 505L, 505R, 515L, and 515R have the common region 700 in which, light is not shielded irrespective of a pattern of the light shielding member of each pixel.

The rest of the structure, action, and effect are similar as in the first embodiment.

Third Embodiment

Figure 9:
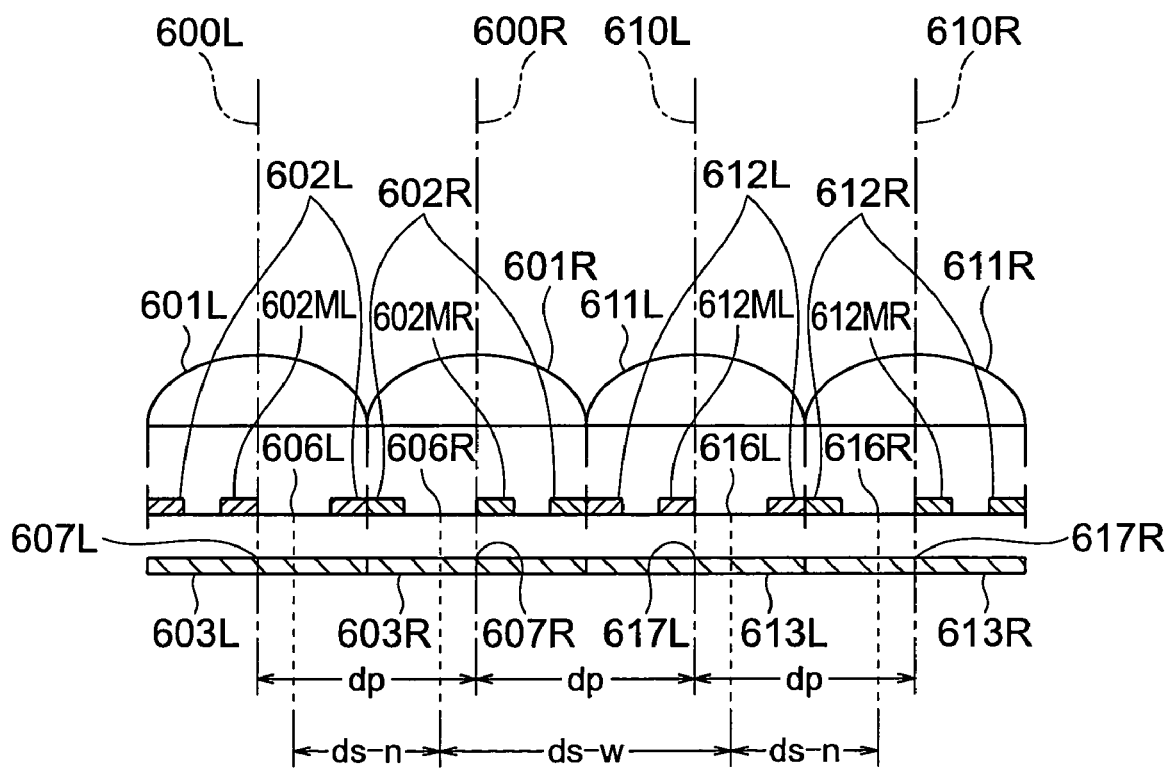
FIG. 9 is a cross-sectional view showing a schematic structure of pixels according to a third embodiment.
Figure 10:
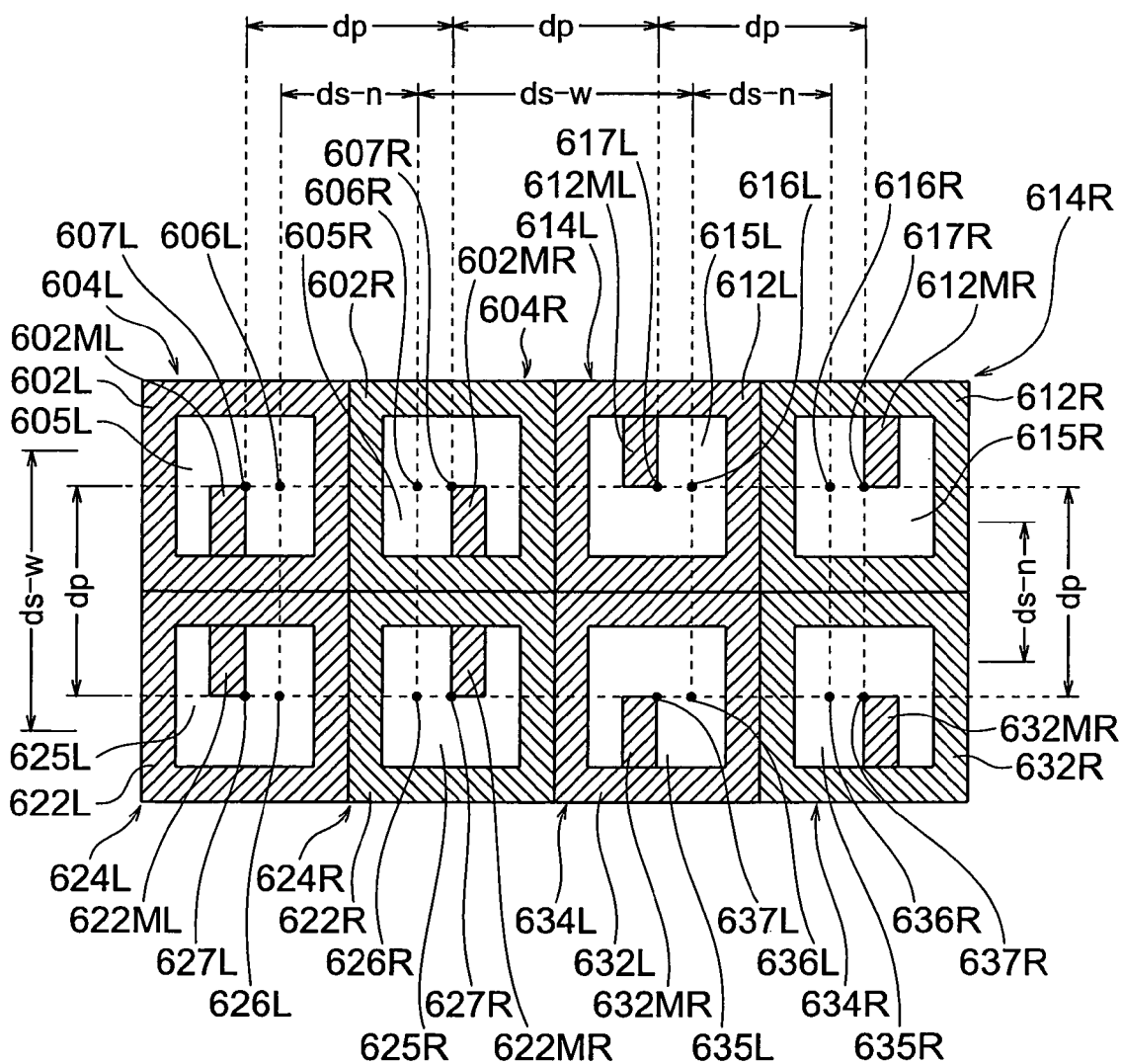
FIG. 10 is a plan view when the pixels shown in FIG. 9 are seen from optical axial directions.

FIG. 9 is a cross-sectional view showing a schematic structure of pixels according to a third embodiment. FIG. 10 is a plan view when the pixels shown in FIG. 9 are seen from directions of optical axes 600L, 600R, 610L, and 610R. In FIG. 10, micro lenses 601L, 601R, 611L, and 611R are omitted. Moreover, in FIG. 10, pixels in four columns and two rows are shown, whereas FIG. 9 corresponds to pixels in one row out of eight pixels in FIG. 10.

In FIG. 9 and FIG. 10, pixels which are lined up side-by-side are shown. An area of each of photoelectric conversion regions 605L, 605R, 615L, 615R, 625L, 625R, 635L, and 635R is same, and distances ds-n and ds-w of positions of centers of gravity of the areas (distance between center of gravity) of areas differ from a distance dp of the pixel pitch.

Here, it is preferable that the area of each of the photoelectric conversion region 605L, 605R, 615L, 615R, 625L, 625R, 635L, and 635R is substantially same. When the area is substantially same, it is preferable that the area satisfies the following conditional expression (1).

$$0.9 < SA/LA \leq 1 \quad (1)$$

where,

LA denotes an area of the largest photoelectric conversion region of a photoelectric conversion cell having a light-receiving spectral sensitivity A, in the photoelectric conversion cell group, and SA denotes an area of the smallest photoelectric conversion region of the photoelectric conversion cell having the light-receiving spectral sensitivity A, in the photoelectric conversion cell group.

In FIG. 9 and FIG. 10, the micro lenses 601L, 601R, 611L, and 611R are disposed to correspond to pixels 604L, 604R, 614L, and 614R respectively, of a sensor. A distance of the micro lenses 601L, 601R, 611L, and 611R is according to the pixel pitch. However, taking into consideration a position of an exit pupil of a taking lens, the micro lenses 601L, 601R, 611L, and 611R may be disposed at an interval smaller than the pixel pitch from a center toward a periphery. A relation between pixels 624L, 624R, 634L, and 634R and micro lenses corresponding to the pixels 624L, 624R, 634L, and 634R which are not shown in the diagram, is also similar.

The pixels 604L, 604R, 614L, 614R, 624L, 624R, 634L, and 634R include photoelectric conversion surfaces 603L, 603R, 613L, 613R, 623L, 623R, 633L, and 633R respectively of a photoelectric conversion cell group. In the pixels in an upper row in FIG. 10, light shielding members 602L and 602ML are disposed between the micro lens 601L and the photoelectric conversion surface 603L, light shielding members 602R and 602MR are disposed between the micro lens 601R and the photoelectric conversion surface 603R, light shielding members 612L and 612ML are disposed between the micro lens 611L and the photoelectric conversion surface 613L, and light shielding member 612R and 612MR are disposed between the micro lens 611R and the photoelectric conversion surface 613R. In pixels in a lower row in FIG. 10, light shielding members 622L and 622ML are disposed between the micro lens of the pixel 624L and the photoelectric conversion surface 623L, light shielding members 622R and 622MR are disposed between the micro lens of the pixel 624R and the photoelectric conversion surface 623R, light shielding members 632L and 632ML are disposed between the micro lens of the pixel 634L and the photoelectric conversion surface 633L, and light shielding members 632R and 632MR are disposed between the micro lens of the pixel 634R and the photoelectric conversion surface 633R.

The light shielding members 602L, 602R, 612L, 612R, 622L, 622R, 632L, and 632R are disposed to be along four sides respectively of the photoelectric conversion surfaces 603L, 603R, 613L, 613R, 623L, 623R, 633L, and 633R having a rectangular shape in a plan view. A planar shape of each of the light shielding members 602L, 602R, 612L, 612R, 622L 622R, 632L, and 632R, as shown in FIG. 10, is bilaterally symmetrical with a uniform width, and has a diphycercally symmetrical rectangular-frame shape.

The light shielding members 602ML, 602MR, 612ML, 612MR, 622ML, 622MR, 632ML, and 632MR are disposed diphycercally and bilaterally asymmetrically with respect to aperture portions of the light shielding members 602L, 602R, 612L, 612R, 622L, 622R, 632L, and 632R respectively, and provided to be extended inward from an upper side or a lower side. Accordingly, shape of apertures by the light shielding members 602L, 602R, 612L, 612R, 622L, 622R, 632L, and 632R becomes bilaterally asymmetric and diphycercally asymmetric. In FIG. 9, the light shielding members are arranged on the same plane. However, the light shielding members may not be arranged on the same plane in the same pixel.

The photoelectric conversion regions 605L, 605R, 615L, 615R, 625L, 625R, 635L, and 635R are determined by a relationship of the corresponding micro lenses, the light shielding members 602L, 602R, 612L, 612R, 622L, 622R, 632L, and 632R, the photoelectric conversion surfaces 603L, 603R, 613L, 613R, 623L, 623R, 633L, and 633R, and a taking lens to be assumed. The photoelectric conversion regions 605L, 605R, 615L, 615R, 625L, 625R, 635L, and 635R shown in FIG. 10 correspond to apertures formed by the light shielding members 602L, 602R, 612L, 612R, 622L, 622R, 632L, and 632R on the photoelectric conversion surfaces 603L, 603R, 613L, 613R, 623L, 623R, 633L, and 633R.

The micro lenses are disposed such that optical axes thereof pass through pixel centers 607L, 607R, 617L, 617R, 627L, 627R, 637L, and 637R of the corresponding pixels.

The pixels 604L, 604R, 614L, 614R, 624L, 624R, 634L, and 634R, as seen from the optical axes of the corresponding micro lenses have the same rectangular shape, and have a pixel pitch same as a size of the pixel. The pixel centers 607L, 607R, 617L, 617R, 627L, 627R, 637L, and 637R of the pixels 604L, 604R, 614L, 614R, 624L, 624R, 634L, and 634R are points of intersection of diagonals of the rectangular planar shape thereof (FIG. 10).

In the pixels 604L and 634L, light on a part of a lower-left portion of the photoelectric conversion regions 605L and 635L (FIG. 10) is shielded by the light shielding members 602ML and 632ML respectively, and accordingly, positions of centers of gravity 606L and 636L of areas of the photoelectric conversion regions are at upper right from the pixel centers. In the pixels 604R and 634R, light on a part of a lower-right portion of the photoelectric conversion regions 605R and 635R (FIG. 10) is shielded by the light shielding members 602MR and 632MR respectively, and accordingly, positions of centers of gravity 606R and 636R of areas of the photoelectric conversion regions are at upper left from the pixel centers.

In the pixels 614L and 634L, light on a part of an upper-left portion of the photoelectric conversion regions 615L and 625L (FIG. 10) is shielded by the light shielding members 612ML and 622ML respectively, and accordingly, positions of centers of gravity 616L and 626L of areas of the photoelectric conversion regions are at lower right from the pixel centers. In pixels 614R and 624R, light on a part of an upper right portion of the photoelectric conversion regions 615R and 625R (FIG. 10) is shielded by the light shielding members 612MR and 622MR respectively, and accordingly, positions of centers of gravity 616R and 626R of areas of the photoelectric conversion regions are at lower left from the pixel centers.

Accordingly, it is possible to make an arrangement such that distances ds-n and ds-w between centers of gravity of areas of the adjacent photoelectric conversion regions differ from the pixel pitch dp in both directions namely a direction of columns and a direction of rows. When pixels having such an arrangement are associated with the right pixel, the left pixel, the upper pixel, and the lower pixel in FIG. 3, it is possible to use the photoelectric conversion regions 605L and 635L as both the right pixel and the left pixel, to use the photoelectric conversion regions 605R and 635R as both the left pixel and the upper pixel, to use the photoelectric conversion regions 615L and 625L as both the right pixel and the lower pixel, and to use the photoelectric conversion regions 615R and 625R as both the left pixel and the lower pixel. However, the arrangement of pixels is not restricted to the abovementioned arrangement.

Even the pixels of the third embodiment have a common region in which, light is not shielded, irrespective of a pattern of the light shielding member.

The rest of the structure, action, and effect are similar as in the first embodiment.

Fourth Embodiment

Figure 11:
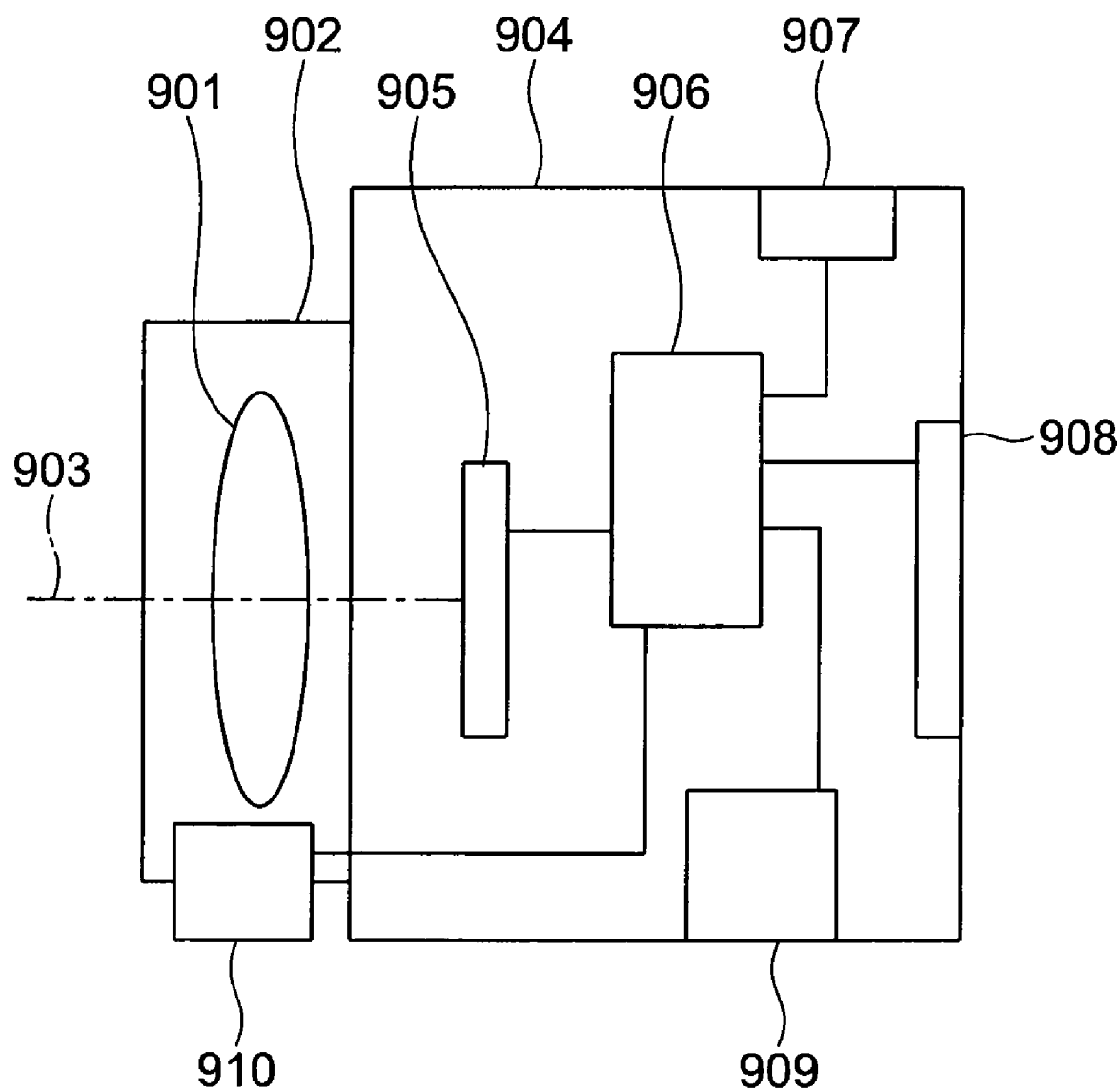
FIG. 11 is a conceptual diagram showing a camera system according to a fourth embodiment.

FIG. 11 is a conceptual diagram showing a camera system according to a fourth embodiment. The camera system includes a camera main-body 904 and a taking-lens unit 902. The taking-lens unit 902 may be integrated or may be interchangeable with respect to the camera main-body 904. Assuming an optical axis 903 of a taking-lens system 901, an image pickup element 905 is disposed on the optical axis 903. The image pickup element 905 includes pixels in the abovementioned embodiments.

A processing unit 906 is a unit which controls a camera system, and is structured to exchange information with the image pickup element 905, an operation unit 907, a display unit 908 such as an electronic view finder for observing through an ocular system and a back display unit, a storage unit 909 which stores images etc. which have been captured, and a drive unit 910 of the taking-lens unit. The storage unit 909 may be a so-called hard disc, or a detachable medium may be used.

In the abovementioned camera system, when 'power supply ON' instruction is given by the operation unit 907, an image signal from the image pickup element 905 is processed in the processing unit 906, and an image is displayed on the display unit 908. According to the requirement, 'zooming operation instruction' is given by the operation unit 907, and the taking-lens system is moved appropriately by the drive unit 910. When 'release instruction' is given by the operation unit 907, exposure conditions (such as an exposure time and an F number) are set from a predetermined calculation formula by the processing unit 906, from information from the image pickup element 905. Moreover, processing unit 906 acquires from the image pickup element 905, a signal required for calculating the focus described in the abovementioned embodiments, from a signal from the processing unit 906, and calculates phase-difference information and an amount of drive of a lens. Furthermore, the taking-lens system 901 is moved appropriately by the drive unit 910 to have an object focused, and the processing unit 906 acquires image information from the image pickup element 905, and carries out processing which is necessary, and records the image information processed in the storage unit 909. The process mentioned above is an example, and it is not necessary to restrict to the abovementioned process. For instance, order of focus drive and exposure setting may be changed, and focusing may be carried out by switching to a normal contrast AF, and using combinations, according to taking conditions. It may be combined with a video recording.

As it has been described above, the present invention is useful for an image pickup apparatus and a camera having a simple structure, in which, an improved ranging performance and less degradation of image quality are sought.

The image pickup apparatus according to the present invention shows an effect that a ranging at same level as with a phase-difference AF is possible with an output signal from an image pickup element, and it is possible to reduce degradation of image with a comparatively simple structure of the image pickup element.

What is claimed is:

1. An image pickup apparatus comprising:
a photoelectric conversion cell group in which, a
plurality of photoelectric conversion cells which convert an optical image formed by an optical system to an electrical signal, are arranged two-dimensionally, wherein
at least some photoelectric conversion cells from among the plurality of photoelectric conversion cells are formed to output an image signal and a signal for ranging, and
areas of a photoelectric conversion regions of photoelectric conversion cells which output the image signal, including the photoelectric conversion cells which output the image signal and the signal for ranging having the same light-receiving spectral sensitivity, in the photoelectric conversion cell group are substantially same, and
the photoelectric conversion cells are arranged such that, for at least two photoelectric conversion cells which are necessary for ranging, a distance between centers of gravity of areas of the photoelectric conversion regions of the photoelectric conversion cells which output the image signal and the signal for ranging differs from a distance between centers, which is calculated from a pixel pitch,
wherein the areas are substantially same means the areas satisfy the following conditional expression (1)

$$0.9 < SA/LA \leq 1 \quad (1)$$

where,
LA denotes an area of the largest photoelectric conversion region of a photoelectric conversion cell having a light-receiving spectral sensitivity A, in the photoelectric conversion cell group, and
SA denotes an area of the smallest photoelectric conversion region of the photoelectric conversion cell having the light-receiving spectral sensitivity A, in the photoelectric conversion cell group.

2. An image pickup apparatus comprising:
a photoelectric conversion cell group in which,
photoelectric conversion cells which convert an optical image formed by an optical system to an electrical signal, are arranged two-dimensionally, wherein the photoelectric conversion cell group includes photoelectric conversion cells which detect one of a plurality of colors, and at least some photoelectric conversion cells from among the photoelectric conversion cells are formed to output an image signal and a signal for ranging, and areas of a photoelectric conversion regions of photoelectric conversion cells which detect the same color, including the photoelectric conversion cells which output the image signal and the signal for ranging, out of the plurality of colors, in the photoelectric conversion cell group are substantially same, and the photoelectric conversion cells are arranged such that, for at least two photoelectric conversion cells which are necessary for ranging, a distance between centers of gravity of areas of the photoelectric conversion regions of the photoelectric conversion cells which output the image signal and the signal for ranging differs from a distance between centers which is calculated from a pixel pitch, wherein the areas are substantially same means the areas satisfy the following conditional expression (1)

$$0.9 < SA/LA \leq 1 \qquad (1)$$

where,

LA denotes an area of the largest photoelectric conversion region of a photoelectric conversion cell which detects a color A, in the photoelectric conversion cell group, and SA denotes an area of the smallest photoelectric conversion region of the photoelectric conversion cell which detects the color A, in the photoelectric conversion cell group, and the color A is an arbitrary color from among the plurality of colors.

3. The image pickup apparatus according to claim 1, wherein the photoelectric conversion cell includes a micro lens which is disposed on a photoelectric conversion portion, and a light-shielding portion which is disposed between the micro lens and the photoelectric conversion portion, and an area of an opening of the light shielding portion determines the photoelectric conversion region.

4. The image pickup apparatus according to claim 1, wherein a focus of the optical system which is for focusing into images of object on an image pickup element is adjusted by a comparison of output signals from the photoelectric conversion cells which are arranged to differ from a distance between centers calculated from the pixel pitch.

5. The image pickup apparatus according to claim 4, wherein the comparison is carried out by an output signal from a plurality of sets of photoelectric conversion cells.

6. The image pickup apparatus according to claim 4, wherein each of a photoelectric conversion region of photoelectric conversion cells of a first cell group which outputs an image signal and a signal for ranging, and a photoelectric conversion region of photoelectric conversion cells of a second cell group which is different from the first cell group, which outputs an image signal and a signal for ranging is disposed such that the distance between the centers calculated from the pixel pitch differs for each of the photoelectric conversion region, and the photoelectric conversion cells of the first cell group and the photoelectric conversion cells of the second cell group are disposed such that distance between the photoelectric conversion cells of the first cell group and distance between the photoelectric conversion cells of the second cell group are the same as the distance between the centers calculated from the pixel pitch, and a focus of the optical system for focusing into an image of object on the image pickup element is adjusted by a comparison of a signal from the photoelectric conversion cell of the first cell group and a signal from the photoelectric conversion cell of the second cell group.

7. The image pickup apparatus according to claim 1, wherein all pixels which output the image signal have a common photoelectric conversion region with respect to respective pixel centers.

8. A camera comprising:

an image pickup apparatus according to claim 1; and an image pickup element which forms an optical image in the image pickup apparatus.

* * * * *